(12) United States Patent
Dixon et al.

(10) Patent No.: US 7,500,049 B2
(45) Date of Patent: Mar. 3, 2009

(54) PROVIDING A BACKING STORE IN USER-LEVEL MEMORY

(75) Inventors: Martin Dixon, Portland, OR (US);
Michael Cornaby, Hillsboro, OR (US);
Michael Fetterman, Cambourne (GB);
Per Hammarlund, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 254 days.

(21) Appl. No.: 11/263,628

(22) Filed: Oct. 31, 2005

(65) Prior Publication Data

US 2007/0101076 A1    May 3, 2007

(51) Int. Cl.
*G06F 12/00* (2006.01)

(52) U.S. Cl. .................. 711/101; 711/122; 712/225

(58) Field of Classification Search .............. None
See application file for complete search history.

(56) References Cited

U.S. PATENT DOCUMENTS

| | | | | |
|---|---|---|---|---|
| 5,428,779 | A * | 6/1995 | Allegrucci et al. | 718/108 |
| 5,768,557 | A | 6/1998 | Kulkarni | 395/468 |
| 6,075,938 | A | 6/2000 | Bugnion et al. | 395/500.48 |
| 6,145,049 | A * | 11/2000 | Wong | 710/267 |
| 6,434,677 | B1 | 8/2002 | Breuder et al. | 711/156 |
| 6,434,683 | B1 * | 8/2002 | West et al. | 711/162 |
| 6,456,891 | B1 * | 9/2002 | Kranich et al. | 700/2 |
| 6,487,630 | B2 | 11/2002 | Bui | 711/109 |
| 6,629,157 | B1 | 9/2003 | Falardeau et al. | 710/10 |
| 6,651,163 | B1 * | 11/2003 | Kranich et al. | 712/244 |
| 6,671,762 | B1 * | 12/2003 | Soni et al. | 710/267 |
| 2002/0056024 | A1 * | 5/2002 | Bui | 711/118 |
| 2005/0120160 | A1 | 6/2005 | Pioffe et al. | |

OTHER PUBLICATIONS

"Itanium Processor Family Performance Advantages: Register Stack Architecture" by Scott Townsend http://www.intel.com/cd/ids/developer/asmo-na/eng/20314.htm?prn=Y Date Unknown.

"Performance Advantages of the Register Stack in Intel Itanium Processors" Rakvic, et al. http://systems.cs.colorado.edu/EPIC2/papers/s2-1-rakvic.pdf 2nd Workshop on Explicitly Parallel Instruction Computing Architecture and Compilers, Monday, Nov. 18, 2002. Istanbul, Turkey.

Boggs, D.; Baktha, A.; Hawkins, J; Marr, D.T.; Miller, J.A.; Roussel, P.; Singhal, R.; Toll, B; Venkatraman, K.S. "The Microarchitecture of the Intel® Pentium® 4 Processor on 90nm Technology." Intel Technology Journal. http://developer.intel.com/technology/itj/2004/volume08issue01/ (Feb. 2004).

PCT/US2006/042619 International Search Report with Written Opinion of the International Searching Authority Mailed Apr. 4, 2008.

GPTO official communication dated Oct. 13, 2008 in related foreign patent application, with English language translation, pp. 1-16.

* cited by examiner

*Primary Examiner*—Than Nguyen
(74) *Attorney, Agent, or Firm*—Trop, Pruner & Hu, P.C.

(57) ABSTRACT

In one embodiment, the present invention includes a method for requesting an allocation of memory to be a backing store for architectural state information of a processor and storing the architectural state information in the backing store using an application. In this manner, the backing store and processor enhancements using information in the backing store may be transparent to an operating system. Other embodiments are described and claimed.

26 Claims, 7 Drawing Sheets

PROVIDING A BACKING STORE IN USER-LEVEL MEMORY

BACKGROUND

Embodiments of the present invention relate to data processing in a processor-based system, and more particularly to executing processor operations transparently to an operating system (OS).

Systems are typically formed of hardware and software components. Typical hardware includes a processor and related circuitry, including chipsets, memories, input/output (I/O) devices and the like. Software components typically include an OS and basic input/output system (BIOS) programs, low-level drivers, and higher-level applications such as user-level applications for performing desired tasks, such as word processing, database processing, scientific computing and the like.

Generally, the OS is the primary scheduler of activities on the system and is fully aware of various processes being executed on the processor. As a result, when additional features or extensions are added to hardware such as the processor, OS support is required in the way of drivers or other software so that the OS can monitor execution of the enhanced hardware. When additional processor features or extensions are to be visible to each process being executed on the processor, the OS may choose to virtualize the feature or extension, such that each process perceives that it has its own private access or copy of the feature or extension.

Upon initiation of a process, the OS provides a process control block (PCB), which is a structure to represent the process in a privileged level of memory (i.e., inaccessible to user-level applications). The PCB may include various information regarding the executing process, such as identification information, state information, register values, memory information, and other such information. Providing such information and maintaining coherency between this information in the processor and the process control block maintained by the OS is a cumbersome and performance sensitive activity.

When certain instructions are added to an instruction set architecture (ISA) additional, extended state may be available in a processor. Further when enhancements to hardware (e.g., processor hardware such as registers and the like) are incorporated, OS support is needed. This support may be in the form of drivers for current OS, or new OS service packs, and future OS versions may include additional code to support the enhancements. Also, additional storage space in a PCB or other OS data structure is needed whenever a new feature is added to a processor.

These extensions can also cause a performance impact on various activities, such as a context switch between two processes. If the additional state due to these extensions is unlikely to be used frequently by most processes, the OS may implement so-called lazy save and restore mechanisms which can be used to postpone and sometimes eliminate the context switches of the additional state due to these extensions, thus saving time. However, in a multiprocessor system, such as a symmetric multiprocessor (SMP) system, these mechanisms are more cumbersome, and typically an OS will instead perform a full state save upon a context switch, which can be a relatively expensive process. Such saves both implicate the OS and are inefficient.

Accordingly, a need exists for an improved manner of implementing enhancements to hardware such as processor extensions.

DETAILED DESCRIPTION

Figure 1:
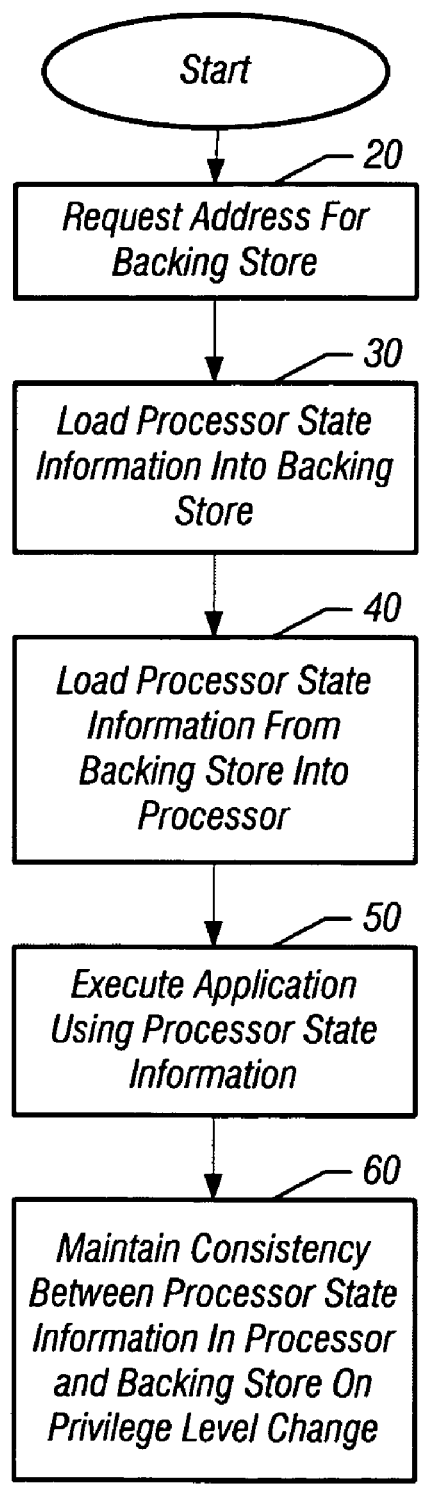
FIG. 1 is a flow diagram of a method in accordance with one embodiment of the present invention.

In various embodiments, application memory (i.e., user-level accessible memory) may be used as storage for some of the per-process or per-thread state information of a processor, rather than requiring the operating system (OS) to provide storage in its PCB or other OS structures. The state information may correspond to architectural state information such as control and configuration registers, physical registers, other control structures, and the like. In some implementations, at least some of these registers may be vector-sized registers substantially wider than scalar registers of the processor. In this manner, an OS may be unaware of additional state added to the processor. Furthermore, the additional state can be used by separate applications without any interaction or coordination between the applications. This in turn enables the use of new processor extensions such as new modes of operation, instruction extensions and the like, on existing operating systems.

Using embodiments of the present invention, processor state may be saved and restored without OS involvement. The state may include N bytes of state, where N can be determined by a given processor feature to be implemented. Furthermore, the mechanisms described herein may be operating system agnostic and transparent, and may perform state save and restore operations with higher performance than if the OS performed full saves and restores on each context switch. To that end, the mechanisms may have minimal overhead to set up and use, and may be used by multiple processes without need for the OS to context switch this managed state. Accordingly, new registers and features may be implemented in a processor without additional storage requirements in an OS process control block. In other words, processor extensions, which may include additional hardware, state, and/or instructions (collectively herein "extensions") to perform new features or functions, may be supported. Furthermore, such support may be provided without OS support. That is, such extensions can be included in a processor and proper execution can occur transparently to the OS. Additionally, processor state need not be saved immediately upon the transition of control to another application. Accordingly, the performance overhead of maintaining state can be minimized, and only context switches which are absolutely necessary will occur. If the nature of the extension is such that it is reasonably unlikely that multiple processes will be simultaneously using the extension, then context switches for this new state are generally avoided. This is especially appropriate, if much extended state is not used, or not used frequently, by most applications.

In this manner, extended (e.g., processor) resources may be virtualized on a per-thread or per-process basis, requiring minimal support from user code, while being entirely OS transparent. In this manner, multiple threads and/or processes may use the extended resources efficiently, with minimal overhead on context changes.

Generally, registers which are available to processes within an OS are explicitly saved and restored by the OS during a context switch. Typically, the OS knows where the backing storage for a process's registers is located, but the hardware does not. Here, however, the processor knows the location of the backing store, and in some embodiments, the OS may not. Instead of explicit saves and restores during a context switch, the hardware maintains one or more bits of state which indicate where the currently authoritative copy of the new extended state resides, either in the hardware's registers, or in the backing store. In some embodiments, only one state bit is used to represent all of the extended state, which is saved and restored as needed by the hardware. In other embodiments, the new extended state may be broken up into smaller pieces, each of which has such a state bit. The hardware can dynamically detect the need to either save or restore a given piece of extended state, i.e., based on the state corresponding to one of these state bits, and transparently perform the save or restore as necessary, and update the state bit accordingly.

When the backing store is the authoritative copy, and the user attempts to access some of the extended state, the hardware transparently restores the state into the processor's registers before continuing. This action might provoke a page fault, as the backing store is not necessarily present. Thus, all new instructions that access such extended state are specified to allow for such page faults.

When the user attempts to modify some of the extended state, the hardware first verifies that the backing store is currently present, writable, and marked as dirty. If it is not, then the appropriate page fault is signaled. Thus, all new instructions that can modify such extended state are specified to allow for such page faults. When such verification occurs, the processor may cache a positive result until certain events occur, thus eliminating the need for frequent verifications. As a side effect of such verification, the processor discovers a physical translation of the virtual address the user specified for the backing store; this physical translation may be retained by the hardware, and used as described below.

In some embodiments, when the user attempts to modify some of the extended state, the processor asserts ownership of the corresponding cache lines in the backing store. The method of doing so varies, depending on the nature of the memory system involved.

In some embodiments, one or more dirty bits are associated with pieces of the extended state. Such dirty bits are cleared when values are restored from the backing store, and when values are saved back to the backing store. Such dirty bits are set whenever instructions are executed which change the value of the corresponding extended register(s).

Whenever the authoritative copy of extended state resides in the processor's register(s), and it is dirty, there is always a valid physical translation of the current backing store stored in the processor. The processor may respond to memory transactions targeted at these addresses. The processor may respond to a memory read request with the values stored in the registers. Thus, the registers are essentially acting as a specialized cache, caching only the memory that is being used as a backing store. Therefore, for each cache line that is included in the backing store, the processor maintains the per cache line state required of whatever memory system exists in the system.

The location of the backing store may potentially be changed by several events. In some embodiments, the user may explicitly change the location. In some embodiments, the OS may be aware of the backing store pointer, and may change it as part of a context switch. As the backing store pointer can be a virtual address, every change of address space may potentially change the physical translation of the backing store. Immediately before any of these events, the authoritative copy of the extended state may exist either in backing store, or in the processor's registers. If the authoritative copy is in the backing store, then no further action is required when the pointer is changed. If the authoritative copy is in the processor's registers, and it is not marked as dirty, then again, no further action is required. If the authoritative copy is in the processor's registers, and it is marked as dirty, some embodiments may immediately save the dirty state out to the backing store. Other embodiments may provide for a means to postpone this state save, and potentially eliminate it. As one example, an implementation might choose to allow the virtual address pointing to the backing store to be updated, but indicate that the physical translation is no longer in synchronization with this new pointer. As long as no attempts are made to access the new extended state, the old physical translation and the extended registers themselves continue to act as a "normal" cache for the cache lines they map, responding to any snoop traffic, and the like. These registers or cache lines can be invalidated by normal cache traffic if another agent asserts ownership. When some subsequent attempt is made to access the extended state, the current backing store pointer is translated (as indicated above), and then compared with the old physical translation. If it is the same, and the extended state cache tags are still valid, then no state save or restore is required; they are completely eliminated, and the bits are set to indicate that the authoritative copy is located in the registers. However, if the translations do not match, the "cache lines" which are still valid are flushed to memory before the new translation is used to fetch the corresponding register values from the new backing store.

As an example implementation, register state information used by a processor may have a backing store located at a user-specified location in user-level paged memory. During process initialization, a backing store area may be requested, e.g., from the OS as an allocated block in memory. While this area is requested from the OS, the OS is unaware of the use of the area as a backing store. The user specifies the address of this storage by setting a register to point to it. In some embodiments, this register is saved and restored by the OS as part of a normal context switch; other embodiments exist which remove this requirement.

Thus, there are two locations at which copies of the extended state can exist: in the extended registers themselves, and (assuming the user has provided a pointer) in the backing store. Whenever the pointer to the backing store is set, the authoritative copy of the state is understood to be in the backing store. Any attempt to use or access the new extended state will cause it to be transparently loaded into the register.

Before each use of the extended state, the processor checks that the pages of memory are present and writeable and marked as dirty, as seen by the OS. If user memory is accessed via a paging system, the processor remembers the translation of the user pages required to hold the new state. This can be viewed as a special purpose translation lookaside buffer (TLB). Once this check is done, and until the processor would normally be required to drop or flush such a TLB entry, the processor can allow unconstrained access to the new state and new features. In some embodiments, the processor may allow its new/extended state to be modified without regard for maintaining consistency with this backing store. By thus relaxing coherency requirements, certain benefits may be realized in a given implementation. In some embodiments, the processor may keep both the pointer to the backing store (a linear or virtual address) and the translated physical address in a structure similar to a TLB. On a current protection level (CPL) change however, the processor may respond to snoops on this area with appropriate responses depending upon the status of the state information (e.g., dirty or clean). On a CPL change in an Intel Architecture (IA-32) environment, the OS may invalidate write permissions to a given page (i.e., storing a backing store) and thus on the resumption from a more privileged state to a less privileged state (e.g., from the OS to the application), the processor once again checks that the pages of memory are present and writeable.

Referring now to FIG. 1, shown is a flow diagram of a method in accordance with one embodiment of the present invention. As shown in FIG. 1, method 10 may implement a technique for creating and using a backing store in user-level application memory. As shown in FIG. 1, method 10 may begin by requesting an address for a backing store (block 20). For example, an application being executed on a processor may request a storage area from an OS. This request for a storage area may be similar to any application request for memory usage. In response to this request, the OS may send a beginning address for the memory area, e.g., a linear pointer to a paged memory.

While not shown in FIG. 1, the application requesting the backing store may be scheduled by an OS to replace a currently running process. The currently running process may also have a backing store in user-level memory. Different manners of accessing this prior application's backing store (if it has one) can be effected. In some implementations, a backing store may be accessed using a fixed pointer, i.e., a pointer stored at an agreed-by-convention location. For example, the pointer may be at a given offset in a thread-private store that can be obtained via, e.g., a machine specific register (MSR). In other embodiments, a pointer to a backing store may be handled in connection with other state information that is subject to an OS-implemented save/restore operation, such as a floating-point state save operation (FXSAVE). Alternately, the address of the backing store may be stored in an OS process control block. Thus in some embodiments, no OS modification or minimal modification is needed to enable storage of a pointer to a backing store as described above.

Referring back to FIG. 1, on a CPL change to implement this context switch, the address of the backing store of the currently running process may be saved. Furthermore, the OS may schedule the new process (i.e., of the application) and also load the beginning address of the new backing store, e.g., into a pointer in the processor. At this time, the processor may write the previous process's data back to the backing store associated with that process. Accordingly, the processor is now ready to execute the new process associated with the application.

Still referring to FIG. 1, next processor state information may be loaded into the backing store (i.e., the user-level application memory) (block 30). Specifically, various processor state information, including control information and data for use in a given process may be loaded into the paged memory. Next, the processor state information in the paged memory may be loaded into the processor (block 40). That is, various information present in the backing store may be loaded into certain configuration registers and data registers of the processor. Using this information, extensions can now be used by the application during execution (block 50). Such operation may continue until the application or process is completed or until another activity is scheduled on the processor, e.g., by the OS. So long as the current application or process is executed, the processor state information in the processor and the backing store may be maintained incoherently. That is, the processor state information in the processor may be modified without writing such changes back to the backing store in memory.

However when a privilege level changes, e.g., when control passes from an application program back to the OS, consistency is maintained between the processor state information in the processor and the backing store (block 60). That is when modifications are made to the processor state information in a different privilege level, the dirty data may be written back to memory, and more specifically to the backing store, to maintain consistency. In different embodiments, various manners of maintaining consistency may be implemented.

When a privilege level changes from a higher privilege level to a lower privilege level, e.g., when control passes from the OS back to the application, the presence of the backing store in memory must be verified. That is, the memory page or pages on which the application has its backing store must be present in memory and writable by the application. Furthermore, in certain implementations it may be necessary to test that the backing store is setup and initialized prior to the usage of any extensions or instructions that utilize the new state.

Figure 2:
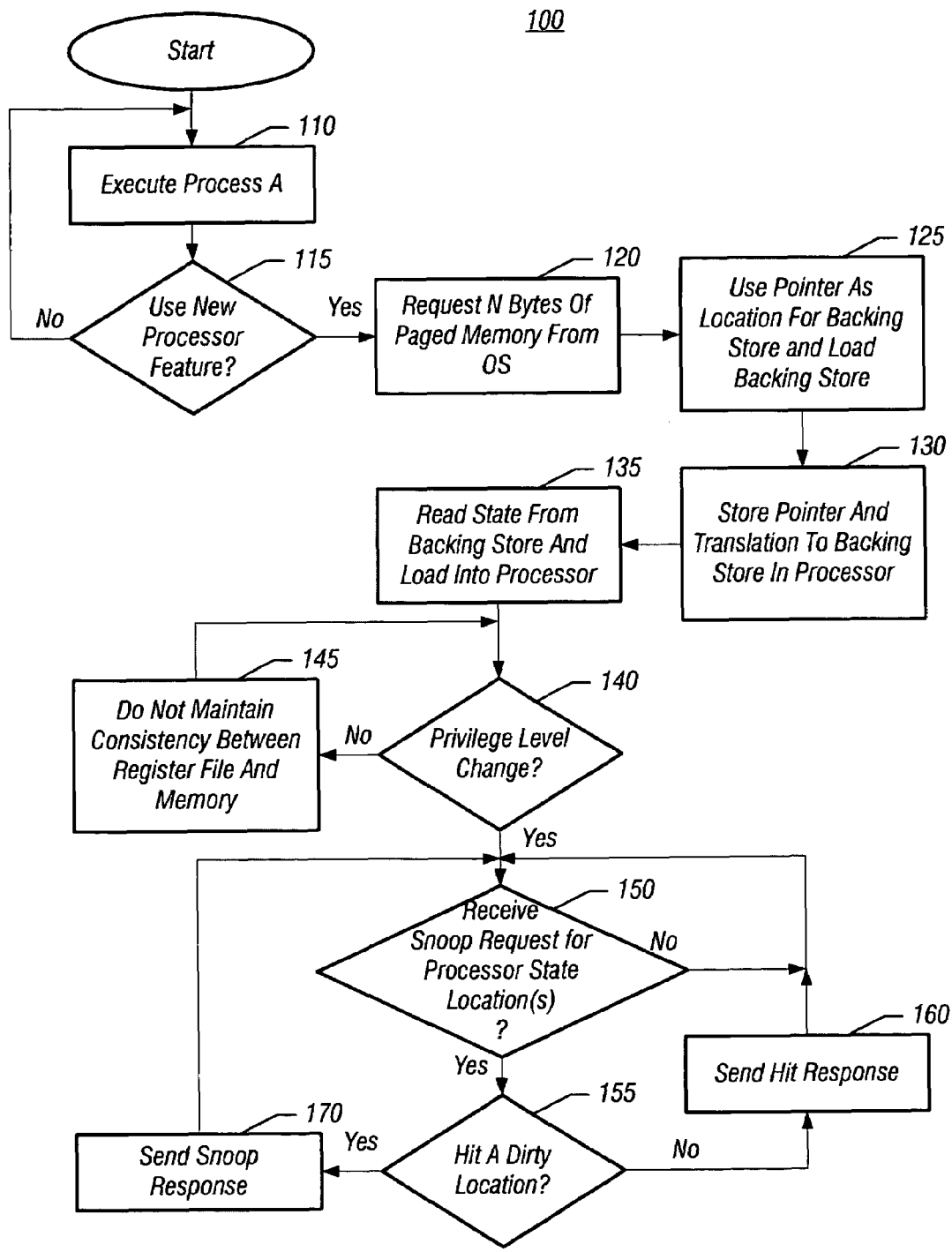
FIG. 2 is a flow diagram of a method of initializing a backing store in accordance with one embodiment of the present invention.

In various implementations, when a process is initiated that is to use certain processor extensions or instructions, and more particularly where such extensions or instructions are not supported by a given OS, a user-level backing store may be set up and used to implement such extensions or instructions without involving the OS. Referring now to FIG. 2, shown is a flow diagram of a method of initializing a backing store in accordance with one embodiment of the present invention. As shown in FIG. 2, method 100 may begin by executing a process A (block 110). When initiating execution of the process, it may be determined whether the process is to use one or more new processor features (e.g., extensions) (diamond 115). As one example, a processor extension may be a vector streaming single instruction multiple data (SIMD) extension (VSSE). Such a VSSE-enabled processor may include additional and extended registers to handle vector instructions, as will be discussed further below. If not, control returns to block 110 and process A continues execution. Instead, if at diamond 115 it is determined that new processor features are to be used, control passes to block 120. There, the application may request a given amount of paged memory from the OS, e.g., N bytes (block 120). In turn, the OS may send a linear pointer back to the application, indicating a starting location of the allocated paged memory. In various implementations, requests to the OS may appear to the OS as any other request for memory by an application. That is, the OS may remain unaware of the backing store and its use with various processor extensions.

Still referring to FIG. 2, next the application may instruct the processor to use the pointer provided by the OS as a backing store for a state save area (block 125). Furthermore, at block 125 the backing store itself may be loaded with the present processor state information. While the processor state information may take various forms, in many embodiments this state information may include the state of various control registers and other control structures of the processor, as well as the values of certain registers, e.g., extended length registers, such as vector length registers in a processor that supports vector operations. Next, the pointer and a translation (i.e., a physical translation) for the pointer location may be stored in the processor (block 130). For example, this translation may be stored in a storage location of the processor, such as a translation buffer, tag location or the like.

Next, the processor may read the state present in the backing store and load it into the processor (block 135). Accordingly, desired state information is now loaded in the processor and further execution of the application or process is possible. Thus execution of the process may continue. During execution, it may be determined whether there is a change in a privilege level, e.g., a current protection level (CPL) (diamond 140). If not, any changes to processor state information occurring as a result of execution of the current process or any other process that is of the same privilege level are not written back to memory. In other words, no consistency is maintained between the processor state information in the processor and the backing store (block 145).

If instead at diamond 140 it is determined that a privilege level has changed, control may pass to diamond 150. There, during execution of the new process of a different privilege level, the processor may determine whether it receives a snoop request for one or more processor state locations (diamond 150). If not, continued execution of the new process occurs in a loop with diamond 150. However, if a snoop request is received for a location of the processor state information, next it may be determined whether the hit is for a dirty location (diamond 155). If the snooped location is not dirty (i.e., clean), meaning that the state of the register and the state of the memory are known to be coherent, a hit response may be sent (block 160), and further execution of the new process may continue via a loop back to diamond 150.

If instead at diamond 155 the snoop request hits a dirty location, meaning that the state of the register and the state of the memory are not known to be coherent, control passes to block 170. There, a snoop response is sent with the dirty data (block 170). In some implementations, the dirty location also may be written back to memory, and more specifically to the backing store. In some embodiments, data may be supplied to the backing store (i.e., memory) via either microcode or a hardware mechanism. In such manner, on a context switch consistency between the processor state information and the backing store may be maintained. Accordingly, the processor state information storage in the processor acts as a cache memory. To that end, in various implementations a processor may include an additional snoop filter (if a snoop filter is already present) to handle incoming snoop requests for these processor state locations. Furthermore, the processor state locations may be extended with one or more indicators to indicate the presence of valid and/or dirty data, although the scope of the present invention is not so limited.

Figure 3:
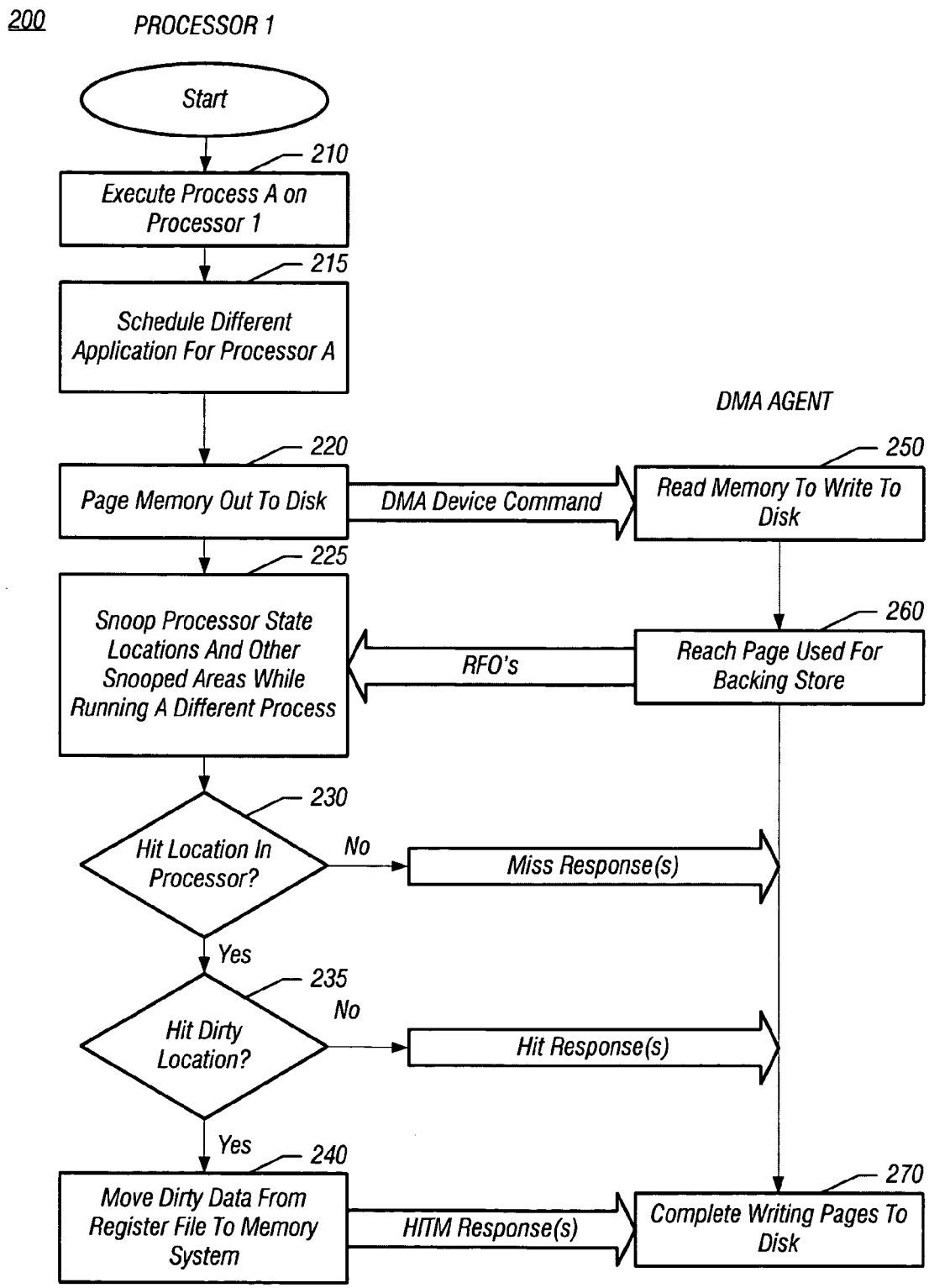
FIG. 3 is a flow diagram of a method of swapping out a task in accordance with one embodiment of the present invention.

Using embodiments of the present invention, backing store data may be swapped out to a lower level of a memory hierarchy (e.g., a disk) on a task switch from a process using the backing store to a different process scheduled by an OS. Referring now to FIG. 3, shown is a flow diagram of swapping out a task in accordance with one embodiment of the present invention. As shown in FIG. 3, method 200 may be used to implement a process that uses processor extensions that take advantage of a backing store. As shown in FIG. 3, method 200 may begin by executing a process (e.g., process A) on a first processor (block 210). For purposes of this embodiment, it may be assumed that process A uses one or more processor extensions and accordingly maintains a backing store in user-level application memory.

Still referring to FIG. 3, next the OS may schedule a different application for processor A (block 215). Furthermore, the OS may page memory corresponding to the first process out to disk (block 220). Accordingly, the OS may send a direct memory access (DMA) device command to a DMA agent, e.g., a disk drive controller. In turn, the DMA agent may begin reading memory that is to be written back to disk (block 250). The DMA agent may continue such reading and writing operations until it reaches a page of memory that is used for a backing store (block 260). When such a page is reached, as with other non-coherent memory structures, the DMA agent may send one or more requests for ownership (RFO) to the first processor. Accordingly, the first processor may snoop the processor state locations within the processor during the course of executing its other (i.e, new) process (block 225). Thus, the processor may treat the processor state locations as cacheable memory locations and they may be snooped by the processor as a conventional cache memory.

Based on the snoop results, it may be determined whether a hit occurs to a location in the processor (diamond 230). For example, a specialized snoop filter within the processor may be used to perform snoops on these state storage locations in the processor. As described above, such locations may be extended with one or more indicators to indicate their status (i.e., valid, dirty, or the like). If there is no hit at diamond 230, a miss occurs and control may pass back to the DMA agent, as will be discussed further below. Next, if a hit has occurred it may be determined whether the hit corresponds to a dirty location (diamond 235). If the location corresponding to the hit is not dirty, a hit response is sent, and control may pass back to the DMA agent. If instead at diamond 235 it is determined that a hit occurs to a dirty location, the first processor may move the dirty data from state storage in the processor (e.g., in a register file) to the backing store in memory (block 240).

Furthermore, in some implementations the processor may send one or more responses to the DMA agent (e.g., hit modified (HITM) responses) that identify the modified location memory, as well as provide the dirty data to the DMA agent. In either event, when the dirty data is available to the DMA agent (either directly or via the backing store), the DMA agent may complete writing the paged memory to disk (block 270). Block 270 is also performed when the backing store locations miss the snoop filter (or are not dirty), receiving control from diamonds 230 and 235 discussed above. While described with this particular implementation in the embodiment of FIG. 3, it is to be understood that the scope of the present invention is not so limited.

Figure 4:
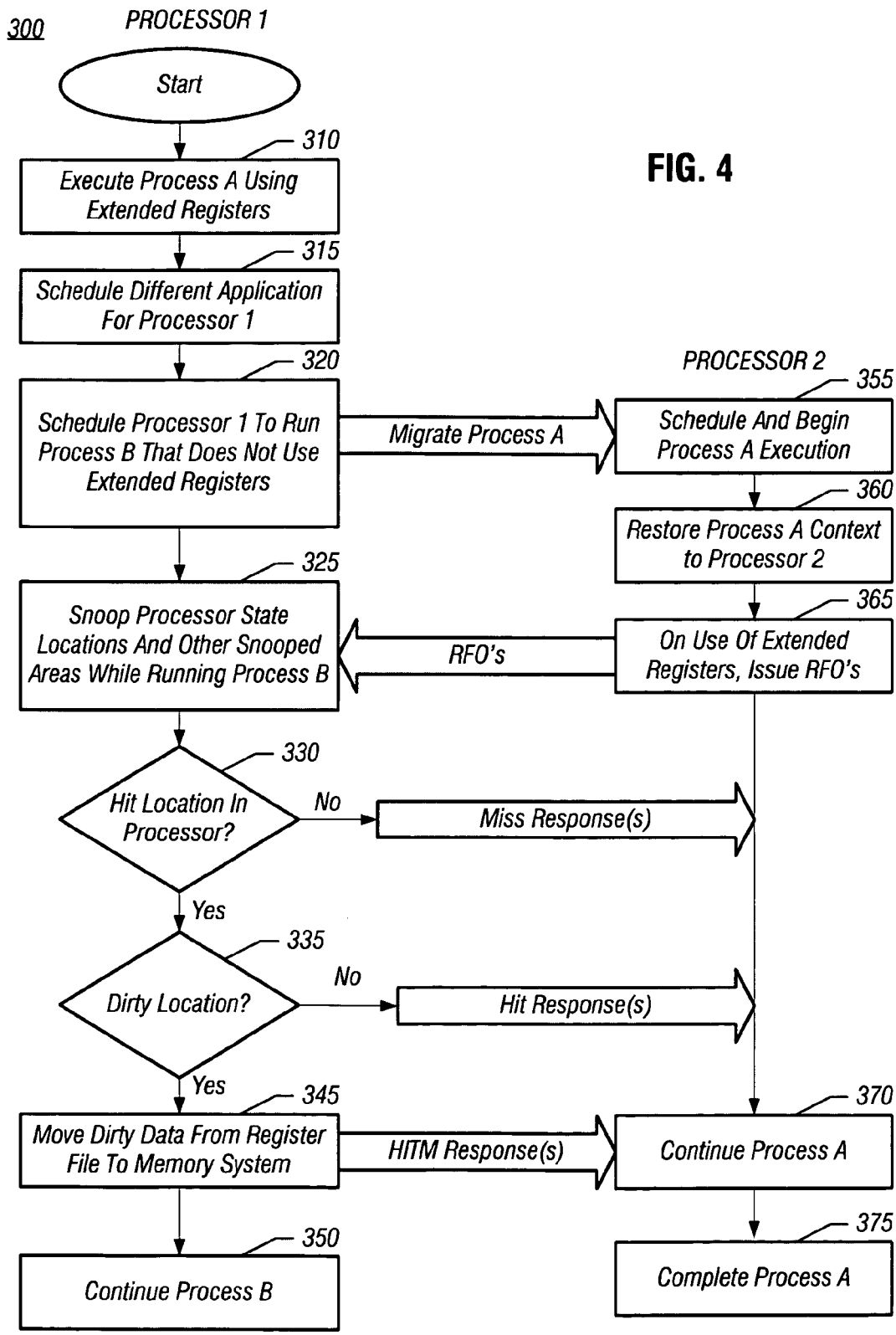
FIG. 4 is a flow diagram of a method of performing process migration in accordance with one embodiment of the present invention.

In some implementations, a process executing on a first processor may be migrated to a second processor, for example, as directed by an OS. If the process implicates extended processor resources and use of a backing store, the backing store may be restored to the second processor for proper operation on the second processor. Referring now to FIG. 4, shown is a flow diagram of a method of performing process migration in accordance with one embodiment of the present invention. As shown in FIG. 4, method 300 may begin by executing a process (e.g., process A) on a first processor using extended registers, for example (block 310). Next an OS may schedule a different application for the first processor (block 315).

Thus at block 320, the OS schedules a process B that does not use the extended registers. Furthermore, the OS schedules migration of process A to a second processor. Accordingly, as shown in FIG. 4, process A is scheduled to begin execution on the second processor (block 355). In one embodiment, a pointer to the backing store may be saved by the OS during a state save operation, e.g., a floating-point state save operation (FXSAVE). To implement execution of process A, the context for process A may be restored to the second processor (block 360). Thus, in the described embodiment the context in the backing store may be restored to the second processor with OS support, e.g., a floating-point restore operation (e.g., FXRSTR). Thus data in the backing store may be provided to processor state registers of the second processor.

Then during execution of process A on the second processor, when extended registers are used, one or more RFO's may be issued by the second processor (block 365). That is, during execution of process B, register state information may be fetched in on demand access to the registers via a cache coherency mechanism, for example. Accordingly, the second processor may send one or more requests for ownership (RFO) to the first processor. Accordingly, the first processor may snoop the processor state locations within the processor during the course of executing its other (i.e, new process) (block 325).

Based on the snoop results, it may be determined whether a hit occurs to a location in the processor (diamond 330). If not, a miss may be sent to the second processor, and control in the second processor passes to block 370, discussed below. If instead a hit occurs at diamond 330, next it may be determined whether the hit corresponds to a dirty location in the processor (diamond 335). For example, as described above a specialized snoop filter within the processor may be used to snoop the processor state storage locations. If the location is clean, an appropriate response is sent to the second processor, and control in the second processor passes to block 370. If instead at diamond 335 it is determined that a hit occurs to a dirty location, the first processor may move the dirty data from state storage (e.g., a register file) in the first processor to the backing store in memory (block 345). Further, the first processor may send one or more responses to the second processor (e.g., hit modified (HITM) responses) that identify the modified storage location, and in some implementations may also provide the dirty data to the requesting agent (i.e., the second processor).

After handling the snoop responses, the first processor may continue execution of process B (block 350). Furthermore, the second processor may continue execution of process A (block 370). Accordingly, process A thus completes on the second processor (block 375).

In some implementations, a process may be executed using multiple threads or sub-processes. To enable use of extended register state information in such multiple threads or sub-processes, one or more additional storage spaces in application memory may be provided. That is, a sub-process of a currently running process may request a separate backing store from the OS to enable replication of the backing store information, thus allowing both processes to continue unimpeded. In such manner, both threads may have a private set of register state to avoid a fault condition.

Figure 5:
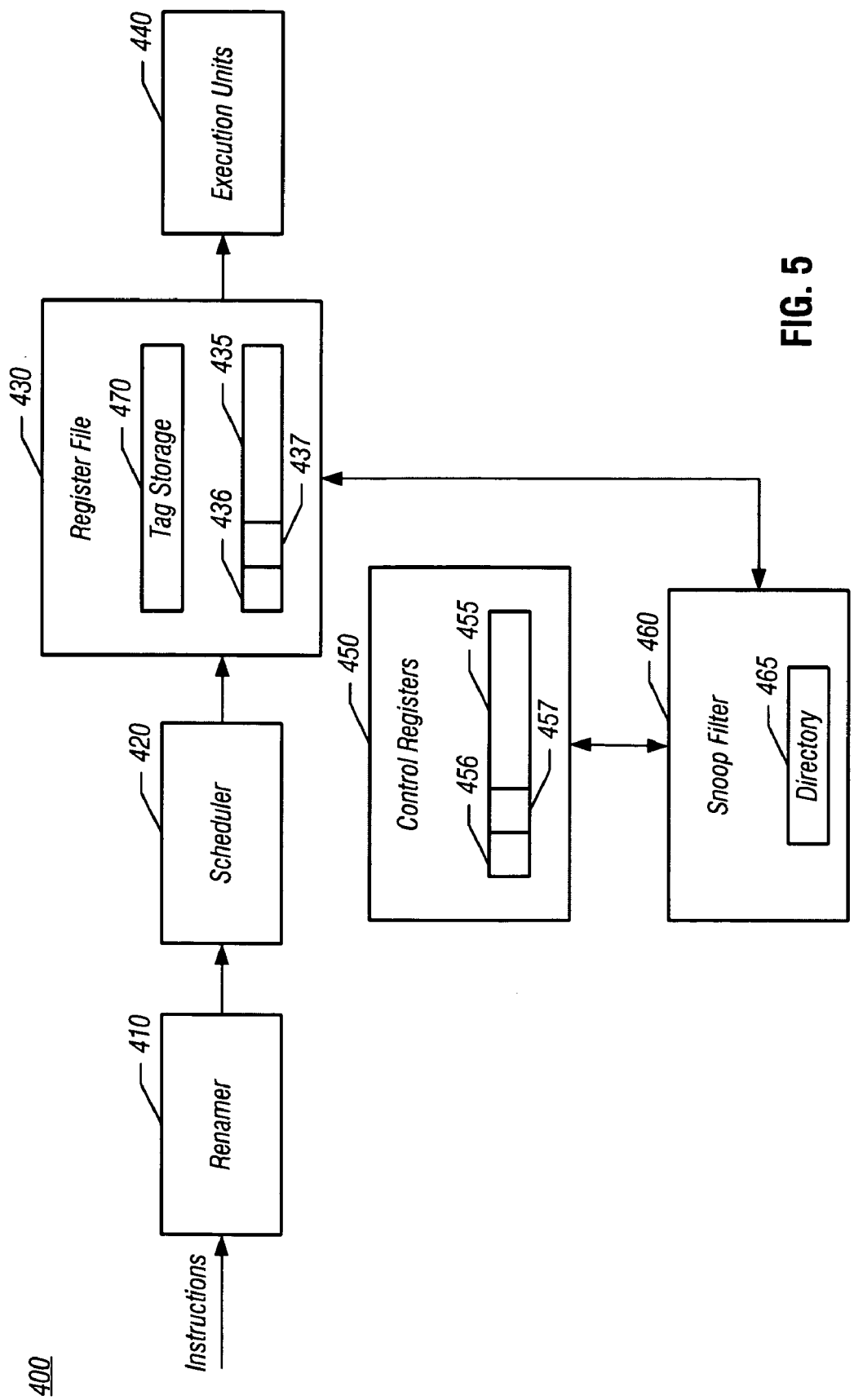
FIG. 5 is a block diagram of a processor in accordance with one embodiment of the present invention.

Embodiments may be implemented in many different processor architectures. Referring now to FIG. 5, shown is a block diagram of a processor in accordance with one embodiment of the present invention. As shown in FIG. 5, processor 400, which may be a multi-stage pipelined processor, includes various structures for use with a backing store in accordance with an embodiment of the present invention.

As shown in FIG. 5, processor 400 may include a pipeline that includes a renamer 410 that may be used to parse instruction bytes into instructions and decode any prefixes. Furthermore, renamer 410 may decode instructions into micro-operations (μops) and also rename register references within the μops from a logical representation to a physical representation. While not shown in FIG. 5, it is to be understood that various front end components of a processor may be coupled in front of renamer 410. Such front end components may include an instruction cache and control stages, among other such components.

Still referring to FIG. 5, renamed instructions may be provided to a scheduler 420, which may obtain necessary data for the instruction (e.g., source operands) and provide them to a register file 430 that may include a plurality of physical registers. Such registers may include normal width registers, as well as extended length registers, in some embodiments. One representative register 435 is shown in FIG. 5. As an example, register 435 may be an extended length register for use in vector operations, for example. An extended length register may take different forms. For example, a plurality of vector registers may each have a greater width than the normal data width of the pipeline, e.g., 256 bits or another such number. In other implementations, a vector register may have an extended length that includes a number of scalar values. For example, a single vector register may include storage for a large number, e.g., 128 scalar values, although the scope of the present invention is not so limited. Furthermore, register 435 may include additional bits to provide indicators for use in maintaining coherency with information in a backing store. Specifically, as shown in FIG. 5, a valid bit 436 may indicate whether register 435 includes valid data and a dirty bit 437 may indicate when the contents of register 435 have been modified.

As further shown in FIG. 5, register file 430 may include storage for additional information, such as a translation storage or tag storage 470. Storage 470, which may be a translation buffer or tag storage, may be used to store a translation from a logical address to a physical address for the pointer received from the OS that points to the beginning of a backing store in user-level memory. In other embodiments, however, tag storage 470 may be located outside of register file 430.

When all needed data for a μop is present in register file 430, the μop may be executed via one of execution units 440. In various implementations different execution units may be present. For example, integer, floating point, address generation, single instruction multiple data (SIMD), and store data (STD) units may be present, although the scope of the present invention is not so limited. After execution, result data may be provided back to register file 430 for storage until the instruction retires. Then, the result data may be written back to a desired location (e.g., of a memory hierarchy).

While shown with this implementation in the embodiment of FIG. 5, many variations are possible. For example, a write back stage may be coupled to execution units 440 to receive result data for later delivery to the memory hierarchy. Alternately, one or more other buffers such as store buffers, load buffers and the like may be coupled to register file 430. As one example, one or more retirement buffers may be coupled to register file 430 for storage of μops and associated result data until retirement of the associated instruction.

As further shown in FIG. 5, additional structures within processor 400 may be used to handle operations in connection with a backing store. For example, processor 400 may include a plurality of control registers 450 which may provide for storage of processor state information. These control registers may include registers for storage of control information used by the processor in execution of instructions, for example, control registers (CR's). Additional processor state information may also be stored within control registers 450. Such processor state information may include various extensions and/or support for new processor instructions. For example, in an implementation for use with vector extensions, a plurality of vector control registers may be present. Such registers may provide control information for use in implementing vector operations. As examples, these vector registers may include a vector length register and a vector stride register, among other such control registers. Still further, in implementations used in connection with processor extensions for improving performance via profile-guided optimizations, a plurality of control registers corresponding to one or more channels for storage of information associated with different performance counters or processor events may be present.

In such manner, control registers 450 may provide architectural state information that is used to handle processor extensions without the need for OS support. One representative register 455 is shown in FIG. 5. Register 455 may be further extended to include indicators 456 and 457, which may indicate the presence of valid data and whether the register contents have been modified, for example. As shown in FIG. 5, control registers 450 may be in communication with a snoop filter 460, which may be an additional snoop filter (a main snoop filter is not shown in FIG. 5 for ease of illustration) used to handle requests from other system agents. Specifically, snoop filter 460 may handle requests for ownership (RFO's) or other snoop requests for information stored in control registers 450 and register file 430, for example. In such manner, these registers of processor 400 may act as a cache. Accordingly, snoop filter 460 may receive incoming requests and determine whether a requested address corresponds to a location in either of control registers 450 or register file 430. As further shown in FIG. 5, snoop filter 460 may include a directory 465 that includes translations to physical addresses corresponding to locations within register file 430 and control registers 450. In such manner, logical addresses received as snoop requests may access directory 465 to determine whether a hit occurs.

If a hit occurs within directory 465, snoop filter 460 may snoop the physical location in register file 430 or control registers 450 to determine a state of the location. If the location is dirty, snoop filter 460 may so indicate to the requesting agent and further provide the dirty data to both the requesting agent and to the backing store in memory. In such manner, snoop filter 460 may maintain coherency between the contents of these locations and a requesting agent, such as a DMA agent or another processor of a multi-processor system. While shown with this particular implementation in the embodiment of FIG. 5, it is to be understood that a processor may take many different forms depending on a desired architecture.

Figure 6:
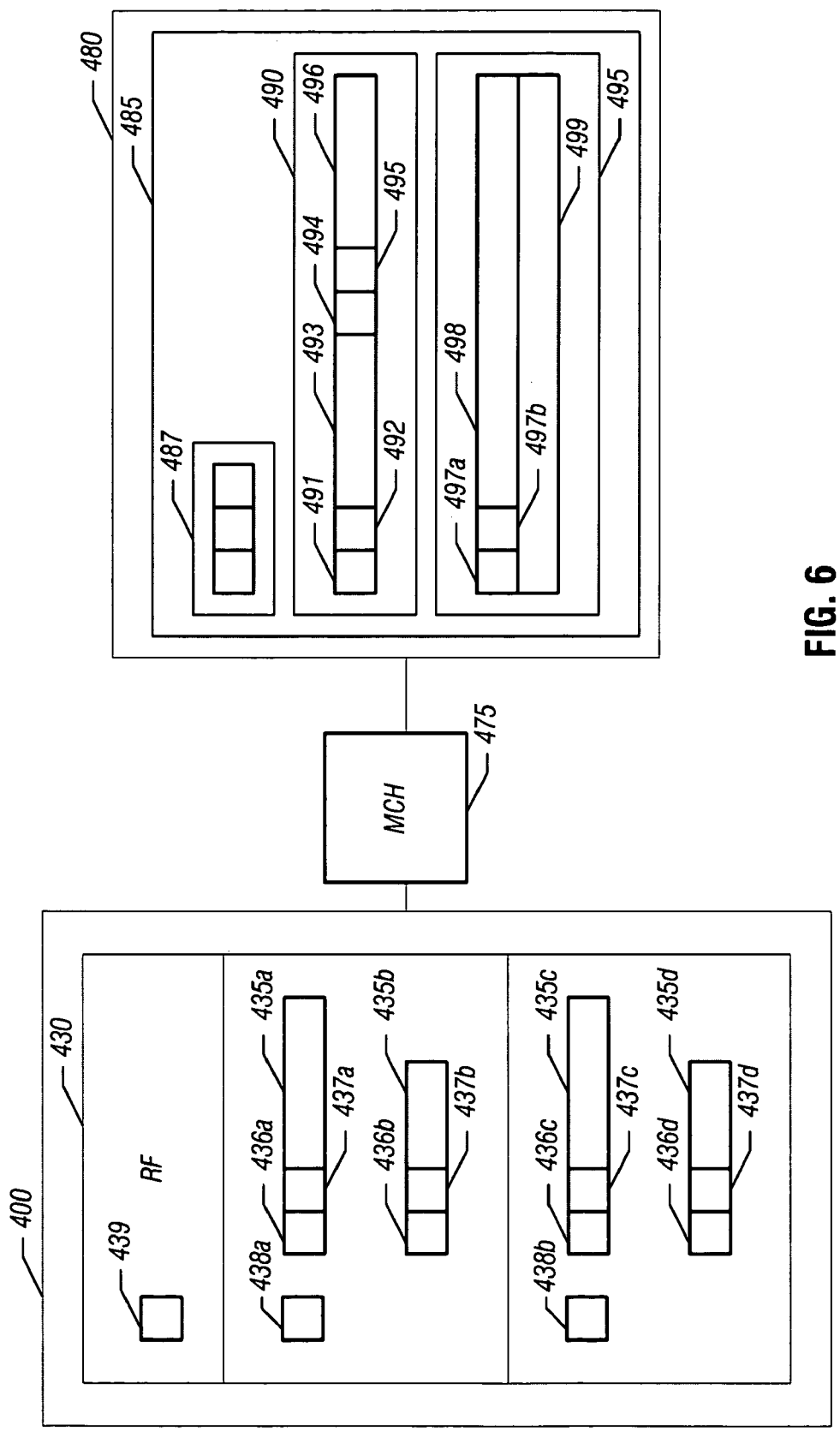
FIG. 6 is a block diagram of a portion of a system in accordance with one embodiment of the present invention.

Referring now to FIG. 6, shown is a block diagram of a portion of a system in accordance with one embodiment of the present invention. As shown in FIG. 6, a processor 400 is coupled to a memory 480 via a memory controller hub (MCH) 475. While shown with this implementation in the embodiment of FIG. 6, it is to be understood that processor 400 may be directly coupled to memory 480, e.g., via point-to-point interconnects or in another such manner.

As shown in FIG. 6, processor 400 includes a register file 430 that may be partitioned into different portions. Specifically, the portions shown in FIG. 6 include extended resources, and more specifically additional registers of varying lengths. As shown, a first portion includes an extended length register 435a and another register 435b. Each of these registers may have various state bits associated with them. In the embodiment shown in FIG. 6, a valid bit 436a and a dirty bit 437a may be associated with register 435a, while similar bits 436b and 437b may be associated with register 435b. Furthermore, in some implementations, a present bit 438a may be associated with a defined portion of register file 430. Present bit 438a may indicate whether a backing store corresponding to that portion of register file 430 is present in memory.

Note that in various embodiments, different granularities of the various state bits may be provided. For example as shown in FIG. 6, a global present bit 439 may be associated with register file 430 to indicate that a backing store corresponding to the state associated with a currently running process is present in memory. Note further that FIG. 6 shows that similar registers and state bits corresponding to another partition of memory are also present, namely registers 435c and 435d and their related status bits, namely 436c and 436d, 437c and 437d, and 438b.

Still referring to FIG. 6, memory 480 may include a backing store 485 that corresponds to the process currently running on processor 400. Backing store 485 may include global state indicators 487 to indicate presence of a memory page corresponding to a backing store, along with other state information, such as valid and/or dirty bits. Furthermore, backing store 485 shows that due to the size of different registers within register bank 430, backing store information corresponding thereto may be present in one or more cache lines. Thus as shown in FIG. 6, backing store information corresponding to multiple normal-sized registers may be stored in a single cache line 490 that includes support for multiple registers as backing store information 493 and 496, along with corresponding state indicators, e.g., indicators 491 and 492 associated with backing store information 493 and indicators 494 and 495 associated with backing store information 496. These indicators may correspond to valid and dirty bits, for example. Furthermore, backing store 485 includes multiple cache lines 498 and 499 that together form backing store information 495 that corresponds to an extended length register, for example. Accordingly, indicators 497a and 497b may be associated with backing store information 498 and 499.

While shown with this particular implementation in the embodiment of FIG. 6, it is to be understood that the scope of the present invention is not so limited, and in various embodiments different granularities of status indicators, such as present/non-present and dirty/clean bits may be accommodated. For example, in different embodiments granularity may be on a per-register basis, a per-register bank basis, or a register file basis.

Accordingly, in various embodiments space may be allocated for instruction set additions and extensions to a processor architecture without a need for OS support. Embodiments may be implemented in various processor architectures, including for example, chip multiprocessors (CMPs), small core arrays, other multicore processors, coprocessors or other such systems.

Figure 7:
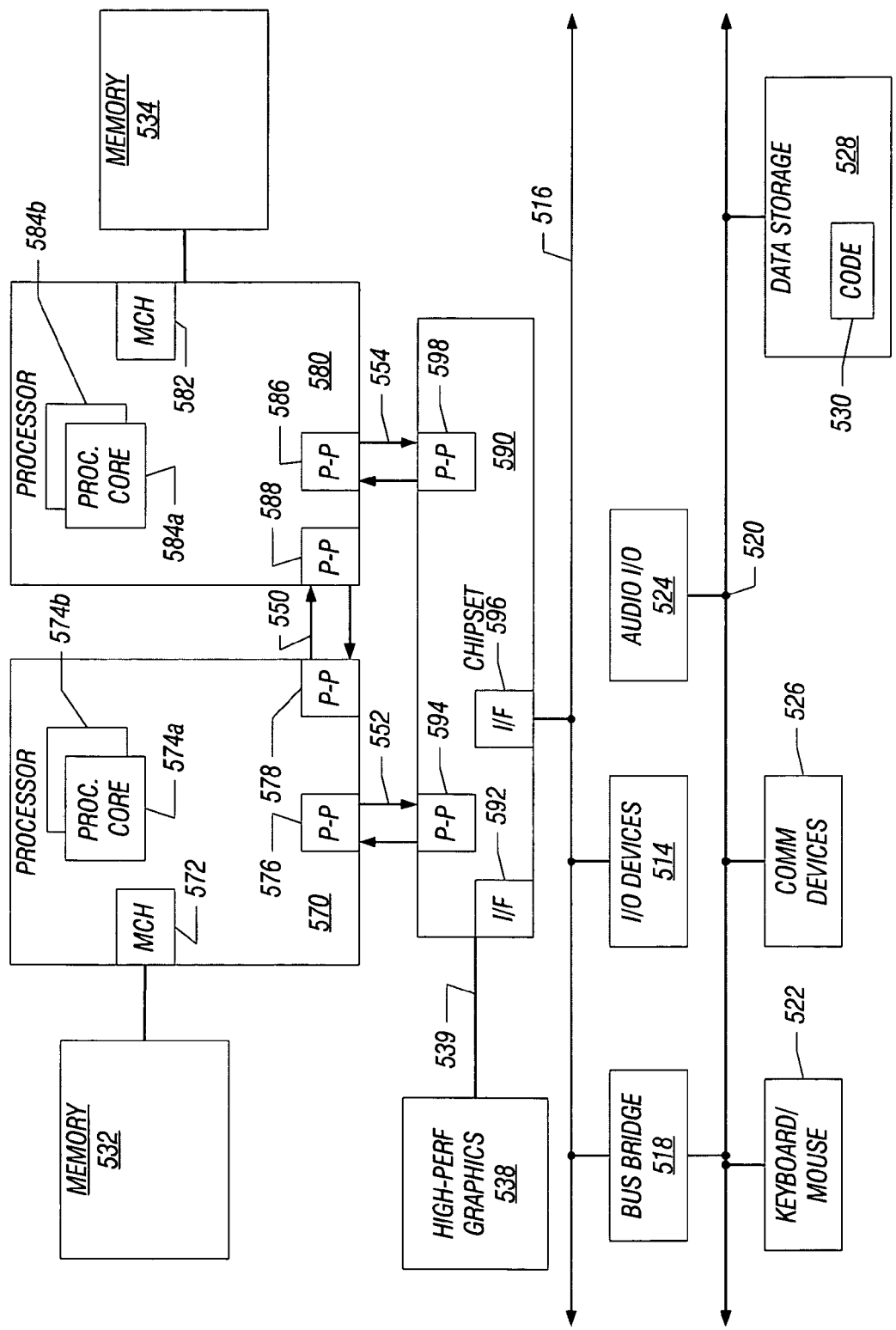
FIG. 7 is a block diagram of a system in accordance with an embodiment of the present invention.

Thus embodiments may be implemented in many different system types. Referring now to FIG. 7, shown is a block diagram of a system in accordance with an embodiment of the present invention. As shown in FIG. 7, the multiprocessor system is a point-to-point interconnect system, and includes a first processor 570 and a second processor 580 coupled via a point-to-point interconnect 550. As shown in FIG. 7, each of processors 570 and 580 may be multicore processors, including first and second processor cores (i.e., processor cores 574a and 574b and processor cores 584a and 584b). While not shown for ease of illustration, first processor 570 and second processor 580 may include one or more register banks having general-purpose storage registers, as well as control registers for use in normal execution and extended operation modes, for example, vector extensions. First processor 570 further includes a memory controller hub (MCH) 572 and point-to-point (P-P) interfaces 576 and 578. Similarly, second processor 580 includes a MCH 582 and P-P interfaces 586 and 588. As shown in FIG. 7, MCH's 572 and 582 couple the processors to respective memories, namely a memory 532 and a memory 534, which may be portions of main memory locally attached to the respective processors. These portions of main memory may be used to implement a backing store in accordance with an embodiment of the present invention.

First processor 570 and second processor 580 may be coupled to a chipset 590 via P-P interfaces 552 and 554, respectively. As shown in FIG. 7, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the *Accelerated Graphics Port Interface Specification, Revision* 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the *PCI Local Bus Specification, Production Version, Revision* 2.1, dated June 1995 or a bus such as a PCI Express bus or another third generation I/O interconnect bus, although the scope of the present invention is not so limited.

As shown in FIG. 7, various input/output (I/O) devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    allocating a portion of a memory to be a backing store for architectural state information of a processor, wherein the architectural state information includes extended state information of which an operating system (OS) is unaware, the extended state information corresponding to an extended processor feature unsupported by the OS, including receiving a pointer corresponding to a starting address for the backing store from the OS, wherein the backing store resides in user-level memory; and
    storing the architectural state information in the backing store via an application and without OS involvement.

2. The method of claim 1, further comprising virtualizing the extended processor feature.

3. The method of claim 1, further comprising modifying the architectural state information of the processor during execution of the application, wherein the architectural state information is incoherent with the backing store.

4. The method of claim 1, further comprising writing at least a portion of the architectural state information to the backing store after a current protection level change from a first privilege level to a second privilege level.

5. The method of claim 4, further comprising writing dirty data to the backing store in response to a hit in a snoop filter of the processor.

6. The method of claim 1, further comprising:
    swapping the application out for a second application; and
    snooping the architectural state information in the processor while executing the second application in response to a cache coherency protocol request from a second processor executing the application.

7. The method of claim 6, further comprising:
    restoring a context for the application to the second processor from the backing store; and
    providing the architectural state information from the processor to the second processor if the architectural state information is in a dirty state in the processor.

8. An apparatus comprising:
    at least one execution unit to execute operations;
    a register file coupled to the at least one execution unit to store data, the register file including a storage location to store a pointer to a memory location of a backing store in a user-level memory; and
    a snoop filter coupled to the register file to receive a snoop request and including a directory to store address translations, the snoop filter to snoop the register file to determine a state of a location therein if the snoop request hits in the directory for an address in the backing store corresponding to the location in the register file.

9. The apparatus of claim 8, wherein the register file includes at least one resource to be virtualized on a per-process basis without operating system (OS) involvement.

10. The apparatus of claim 9, wherein the at least one resource includes an extended length register unsupported by the OS.

11. The apparatus of claim 10, wherein the backing store includes a plurality of cache lines to cache the extended length register.

12. The apparatus of claim 10, wherein the at least one resource further includes a second and third register unsupported by the OS.

13. The apparatus of claim 12, wherein the backing store includes a cache line to cache the second and third registers.

14. The apparatus of claim 8, wherein the at least one execution unit is to initiate the backing store under user-level control and transparently to an operating system (OS), and wherein the apparatus is to receive a pointer from the OS corresponding to a starting address for the backing store.

15. The apparatus of claim 8, wherein the apparatus is to send a response to a request for ownership, the response including dirty context information stored in the register file for a first process previously executed on the apparatus, to a processor coupled to the apparatus that is executing the first process.

16. A system comprising:
a first processor including a state information storage and a filter to access the state information storage on a request for ownership of information, wherein state information in the state information storage is also present in a backing store in user-level memory that is maintained incoherent with the state information;
a second processor coupled to the first processor to communicate the request for ownership to the first processor and to receive a response from the first processor to the request for ownership, the second processor to execute a process swapped out of the first processor, wherein the second processor is to obtain context information for the process from the backing store and communicate the request for ownership for the context information, and the first processor is to send the response to the second processor including dirty context information in the state information storage; and
a dynamic random access memory (DRAM) coupled to The first processor and the agent.

17. The system of claim 16, wherein the agent comprises a direct memory access (DMA) agent to write data from the DRAM to a mass storage device.

18. The system of claim 17, wherein the DRAM includes the backing store, the backing store including a first cache line to accommodate state information from multiple registers of the state information storage.

19. The system of claim 18, wherein the backing store includes a second cache line and a third cache line, the second and third cache line to accommodate state information from an extended register of the state information storage.

20. The system of claim 16, wherein the state information storage comprises at least one control register for a processor extension to execute without operating system (OS) support.

21. An article comprising a computer-readable storage medium including instructions that if executed by a computer enable the computer to perform a method comprising:
requesting an address for a first backing store in user-level memory for a first process;
loading processor state information into the first backing store, the processor state information including information of a feature of a processor unsupported by an operating system (OS);
copying the processor state information from the first backing store to a register bank of the processor;
executing the first process on the processor using the processor state information in the register bank; and
determining if the processor state information in the register bank is the authoritative copy of the processor state information.

22. The article of claim 21, wherein the method further comprises maintaining the first backing store incoherently with the processor state information in the register bank during execution of a privilege level for the first process.

23. The article of claim 22, wherein the method further comprises maintaining the first backing store coherently with the processor state information in the register bank during execution of a different privilege level than that of the first process.

24. The article of claim 21, wherein the method further comprises loading the processor state information into the first backing store and copying the processor state information transparently to the OS.

25. The article of claim 21, wherein the method further comprises moving the first process to a second processor and snooping the register bank upon a request for ownership for the processor state information.

26. The article of claim 21, wherein the method further comprises:
modifying the processor state information if the authoritative copy is present in the register bank; and
loading the processor state information from the first backing store into the register bank if the authoritative copy is present in the first backing store, the loading being transparent to the OS.

* * * * *